United States Patent
Shiu et al.

(10) Patent No.: US 8,514,909 B2
(45) Date of Patent: Aug. 20, 2013

(54) NOISE AND CHANNEL ESTIMATION USING LOW SPREADING FACTORS

(75) Inventors: Da-Shan Shiu, San Jose, CA (US); Durga Malladi Prasad, San Diego, CA (US); Srikrishna Bhashyam, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/046,199

(22) Filed: Mar. 11, 2011

(65) Prior Publication Data

US 2011/0158293 A1 Jun. 30, 2011

Related U.S. Application Data

(60) Division of application No. 11/781,930, filed on Jul. 23, 2007, which is a continuation of application No. 10/290,749, filed on Nov. 7, 2002, now Pat. No. 7,254,170.

(60) Provisional application No. 60/424,474, filed on Nov. 6, 2002.

(51) Int. Cl.
*H04B 1/00* (2006.01)
(52) U.S. Cl.
USPC ........... 375/147; 375/130; 375/140; 375/145; 375/227; 375/260
(58) Field of Classification Search
None
See application file for complete search history.

(56) References Cited

U.S. PATENT DOCUMENTS

| 5,506,865 | A | 4/1996 | Weaver, Jr. |
| 5,751,761 | A | 5/1998 | Gilhousen |
| 5,930,230 | A | 7/1999 | Odenwalder et al. |
| 6,414,988 | B1 | 7/2002 | Ling |
| 7,002,901 | B2 | 2/2006 | Yun et al. |
| 7,139,237 | B2 | 11/2006 | Nangia et al. |
| 7,254,170 | B2 | 8/2007 | Shiu et al. |
| 8,135,056 | B2 | 3/2012 | Shiu et al. |
| 2001/0008542 | A1 | 7/2001 | Wiebke et al. |
| 2001/0017883 | A1 | 8/2001 | Tiirola et al. |

(Continued)

FOREIGN PATENT DOCUMENTS

| JP | 10145839 | 5/1998 |
| JP | 2002518926 | 6/2002 |

(Continued)

OTHER PUBLICATIONS

European Search Report—EP06012714, Search Authority—Munich Patent Office, Aug. 22, 2008.

(Continued)

*Primary Examiner* — Adolf Dsouza
(74) *Attorney, Agent, or Firm* — Sayed H. Beladi; Brian Lambert (57) ABSTRACT

Noise measurements are made within a fraction of a single symbol period of a longest orthogonal code symbol. A control processor identifies an unoccupied code having a spreading factor that is less than a longest spreading factor for the system. A despreader measures symbol energy based on the unoccupied code and a noise estimator generates noise estimations based on the measured symbol energies. The subscriber station uses similar techniques in order to perform channel estimations within a period that is a fraction of a symbol period of a longest-spreading-factor code.

24 Claims, 6 Drawing Sheets

(56) References Cited

U.S. PATENT DOCUMENTS

| | | |
|---|---|---|
| 2001/0026543 A1 | 10/2001 | Hwang et al. |
| 2002/0018457 A1 | 2/2002 | Choi et al. |
| 2002/0057730 A1* | 5/2002 | Karlsson et al. ............. 375/152 |
| 2002/0097785 A1 | 7/2002 | Ling et al. |
| 2002/0136278 A1* | 9/2002 | Nakamura et al. ............ 375/148 |

FOREIGN PATENT DOCUMENTS

| | | |
|---|---|---|
| WO | WO9966643 A2 | 12/1999 |
| WO | WO0057654 A2 | 9/2000 |
| WO | WO0139408 A1 | 5/2001 |
| WO | WO0161949 A1 | 8/2001 |
| WO | WO0251189 | 6/2002 |

OTHER PUBLICATIONS

European Search Report—EP10152957—International Search Authority—European Patent Office—Apr. 13, 2010.
European Search Report—EP10152964—International Search Authority—European Patent Office—Apr. 12, 2010.
International Search Report—PCT/US2003/035260—International Search Authority, European Patent Office, Jul. 27, 2004.
Taiwan Search Report—Application No. 092131085—Feb. 8, 2010.
Taiwan Search Report—TW099131919—TIPO—Mar. 19, 2013.

* cited by examiner

NOISE AND CHANNEL ESTIMATION USING LOW SPREADING FACTORS

CLAIM OF PRIORITY

The present application for patent is a Divisional of patent application Ser. No. 11/781,930, filed Jul. 23, 2007, which is a Continuation Application of application Ser. No. 10/290,749, filed Nov. 7, 2002, now allowed, and Provisional Application No. 60/424,474, filed Nov. 6, 2002 and assigned to the assignee hereof and hereby expressly incorporated by reference herein.

BACKGROUND

1. Field

The present disclosure relates generally to wireless communication, and more specifically to improved noise estimation in a wireless communication system.

2. Background

The field of wireless communication includes many wireless applications such as voice communication, paging, packet data services, and voice-over-IP. One challenge presented by such services are the widely varying requirements for capacity, quality-of-service, latency, data rates in the different services. Various over-the-air interfaces have been developed to accommodate combinations such services using different wireless communication techniques such as frequency division multiple access (FDMA), time division multiple access (TDMA), and code division multiple access (CDMA).

In order to accommodate combinations services having different sets of requirements, communication standards such as the proposed cdma2000 and W-CDMA specify the use of orthogonal codes of varying length on the downlink channels from a wireless base station to a subscriber station. Some standards also specify transmitting signals for different uplink channel (in the direction from the subscriber station to the base station) using orthogonal codes of varying lengths for the different channels. For example, a wireless base station may transmit three types of downlink signals, pilot, voice, and packet data, using a different length orthogonal code symbols to channelize or "cover" each different type of signal. The length of an orthogonal code symbol is typically described as a number of "chips," with a chip being a smallest binary component of a transmitted signal. In a spread spectrum system, each bit of information is multiplied by a sequence of binary chips having a predetermined number of chips-per-bit. Multiplying a single binary information bit by an orthogonal code symbol effectively "spreads" the information bit over all of the chips in the symbol. For this reason, the chip length or chips-per-bit is often referred to as a "spreading factor" of a transmitted information signal.

Another aspect of current spread spectrum systems is the sharing of frequency bands between different subscriber stations and between different base stations. In other words, neighboring base stations in a spread spectrum system transmit their downlink signals in the same frequency band as each other. Because of this sharing (also called "reuse") of frequency bands, downlink signals transmitted by a base station destructively interfere with the downlink signals of neighboring base stations. This interference decreases the capacity of the neighboring base stations, measured in either number of subscriber stations that can be supported or maximum information throughput possible on the downlink. The capacity of such systems can be increased by using power control techniques to decrease the transmit power of all signals to a lowest value that will still permit the signals to be correctly received and decoded by subscriber stations. The effectiveness of power control depends largely on the accuracy of noise measurements made by subscriber stations and base stations. There is therefore a need in the art for a way to provide maximal noise measurement accuracy in systems utilizing varying spreading factors.

SUMMARY

Embodiments disclosed herein address the above-stated needs by enabling noise measurements to be made within a fraction of a single symbol period of a longest orthogonal code symbol. In a first aspect, a subscriber station in a wireless system determines when information is being transmitted on each of the first two channels spread using a longest spreading factor for the wireless system, determines also that the following two channels spread using the longest spreading factor are unoccupied (not being used to transmit data), and performs noise estimation over a period that is a fraction of a symbol period of a longest-spreading-factor code symbol. In a second aspect, a subscriber station determines an unused channel associated with a short-spreading-factor code symbol and performs noise measurement within the symbol period of the short-spreading-factor code. In a third aspect, the subscriber station uses similar techniques in order to perform channel estimations within a period that is a fraction of a symbol period of a longest-spreading-factor code.

The subscriber station may independently identify of the unused channel. Alternatively, a base station may provide the identity of the unused channel to the subscriber station.

BRIEF DESCRIPTION OF THE DRAWINGS

The present invention is described with reference to the accompanying drawings. In the drawings, like reference numbers indicate identical or functionally similar elements.

DETAILED DESCRIPTION

Figure 1:
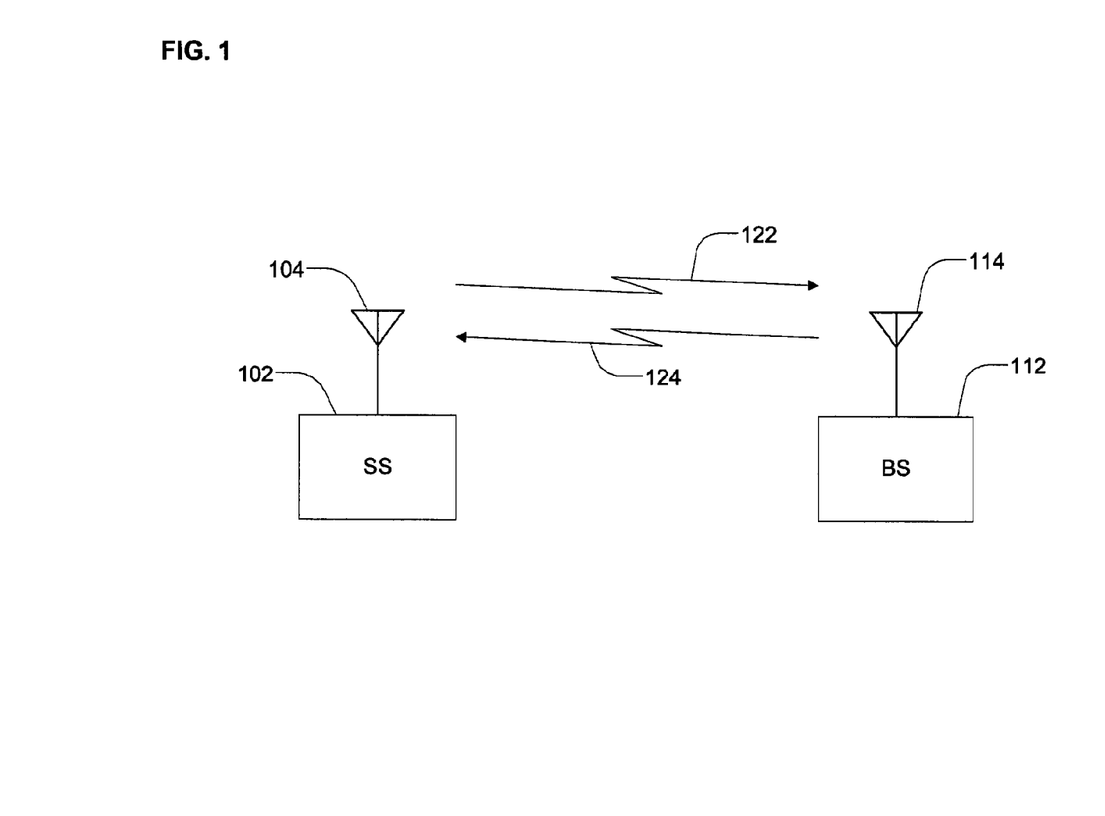
FIG. 1 shows an illustrative wireless communication system.

FIG. 1 shows an illustrative wireless communication system with a single base station including a subscriber station 102 with an antenna 104 communicating with a base station 112 having an antenna 114. Base station 112 or subscriber station 102 may use multiple antennas without departing from the embodiments described herein. Base station 112 transmits wireless signals to subscriber station 102 on downlink channel 124. Subscriber station 102 transmits wireless signals to base station 112 on uplink channel 122. Base station 112 transmits multiple signals on downlink channel 124 using different sub-channels. In an illustrative embodiment, the different downlink sub-channels are distinguished using orthogonal codes. In other words, each bit of data (data bit) to be transmitted on a particular sub-channel is spread by multiplying the data bit by an orthogonal code symbol that is unique among the codes used by the base station 112. In an illustrative embodiment, subscriber station 102 utilizes knowledge of the orthogonal code symbols used to encode the different sub-channels, along with knowledge of which sub-channels are being used to carry data, to perform measurements of the noise received on downlink 124.

As used herein, the term "noise" includes interference from thermal noise as well as interference caused by signals transmitted from other sources. As used herein, a subscriber station may be mobile or stationary, and may communicate with one or more base stations. A subscriber station may further be any of a number of types of devices including but not limited to PC card, compact flash, external or internal modem, or wireless phone, and may include a wireline phone or modem.

Figure 2:
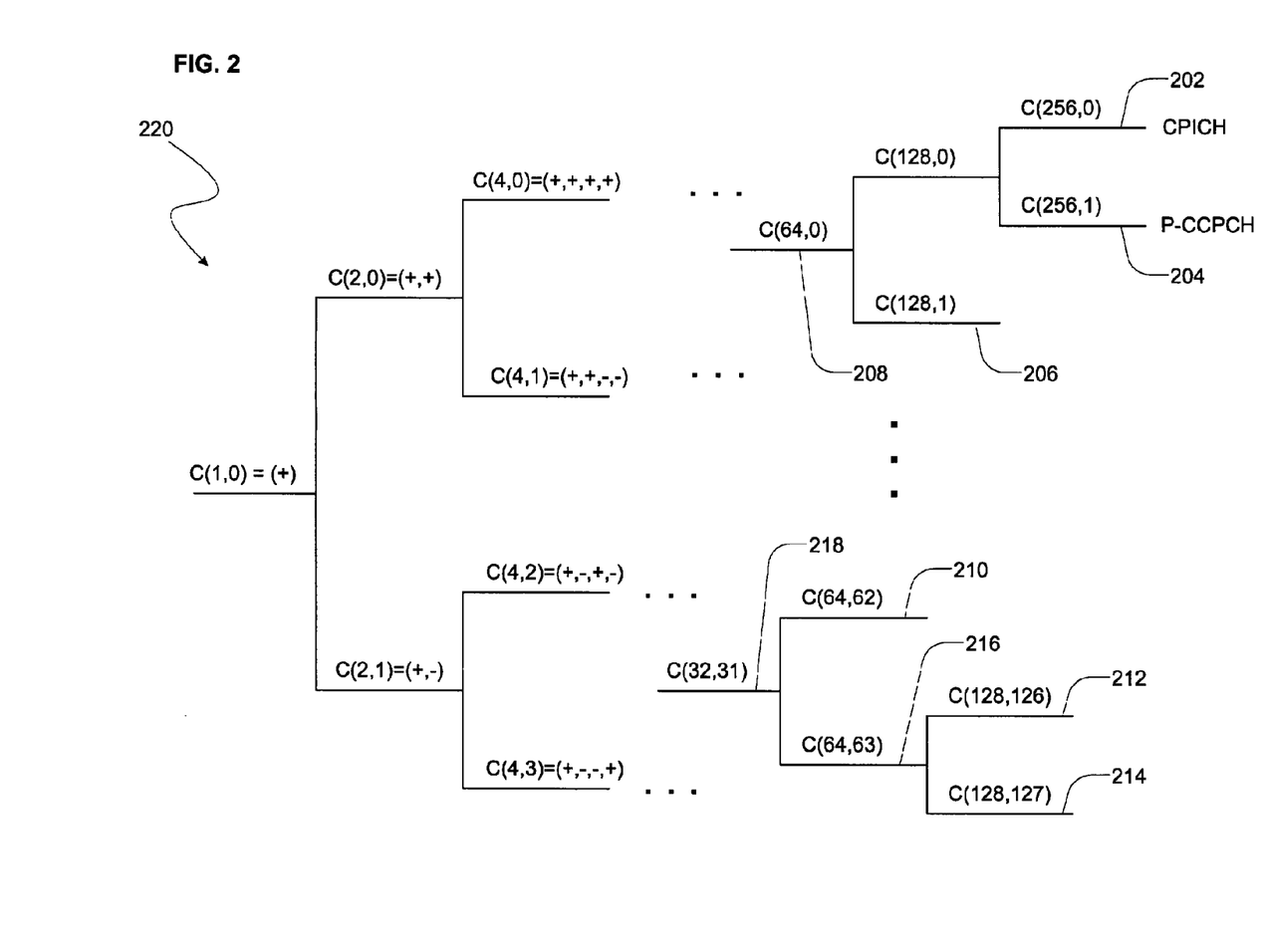
FIG. 2 shows an illustrative coding tree having an unused short-spreading-factor channel.

The techniques that make possible improvements in noise measurements are facilitated by referring to FIG. 2, showing an illustrative coding tree showing assignments of orthogonal code symbols to different sub-channels. The illustrative embodiment shown in FIG. 2 is based on sub-channel designations described in the W-CDMA standard but are applicable to any wireless signal utilizing spreading codes of varying length for different sub-channels. The coding tree 220 in FIG. 2 shows a methodical approach to allocating orthogonal code symbols of varying chip lengths to different sub-channels. Where each data bit is multiplied by an entire code symbol, the length of the code symbol in chips is equal to the spreading factor for the sub-channel.

In FIG. 2, each "parent" orthogonal code of a first symbol length can be used to derive two "child" orthogonal codes having twice that symbol length. The levels of orthogonal code are represented using the notation C(X,Y), where X is the number of chips in the orthogonal code, and Y is a sequence number of the codes at that level from top to bottom. The value X may also be viewed as the spreading factor (SF) of the corresponding code. When two child orthogonal codes are derived from a parent orthogonal code, the first of the two codes will be the parent code repeated twice, and the second of the two codes will be the parent code followed by the negative of that code. Thus, the two-chip C(2,0) code having the chip sequence (+,+) splits into two four-chip child codes, C(4,0)=(+,+,+,+) and C(4,1)=(+,+,−,−). Similarly, the two-chip C(2,1) code having the chip sequence (+,−) splits into two four-chip child codes, C(4,2)=(+,−,+,−) and C(4,3)= (+,−,−,+). Constructed this way, all the codes at the "leaf" nodes of the tree are guaranteed to be orthogonal to all other leaf-node codes, even if the codes at some leaf nodes are longer (contain more chips) than other leaf-node codes.

Although code tree 220 is shown with the longest "branches" at the top, i.e. such that the longest codes have lower values for Y in the C(X,Y) notation, nothing precludes use of a code tree that has long branches extending to the right from lower branches. For example, the C(4,0) and C(4,3) branches of the tree may extend all the way to leaf-node codes of length 256 chips at the same time that C(4,1) and C(4,2) are used as leaf node codes.

As mentioned above, the illustrative channel allocation shown in FIG. 2 is based on sub-channel designations described in the W-CDMA standard. Accordingly, the C(256, 0) code at code tree branch 202 is used to spread a pilot sub-channel known as the Common Pilot Channel (CPICH) and the C(256,1) code at code tree branch 204 is used to spread a Primary Common Control Physical Channel (P-CCPCH). The longest code in code tree 220 is 256 chips. Thus, 256 chips is called the longest spreading factor of code tree 220, and any code in code tree 220 having a length of 256 chips is called a longest-spreading-factor code. The CPICH and P-CCPCH are longest-spreading-factor codes in the W-CDMA code tree.

As mentioned above, contemplated spread spectrum systems utilize different spreading factors for different channels based on the requirements of the service associated with the channel. For example, in W-CDMA, a pilot signal is covered using pilot channel symbols having a length of 256 chips, a voice signal is covered using channel symbols having a length of 128 chips, and a packet data signal may be covered using channel symbols having a length of 64 chips. Thus, the spreading factors of the pilot, voice, and packet data channels are 256, 128, and 64, respectively. Additionally, some low-vocoder-rate voice signals can also be covered using 256-chip channel symbols.

Where it is not known which channels are being used to carry information signals, noise measurements may only be made over the longest spreading factor. In other words, in a W-CDMA system using the code tree shown in FIG. 2, if a subscriber station does not know which channels remain unallocated, the subscriber station may only generate noise measurements over the longest spreading factor of 256 chips.

Improved noise measurement is possible, however, where the subscriber station knows that one or more channels having a shorter spreading factor. In an illustrative embodiment, the subscriber station determines that a channel having a spreading factor of 128 chips is unused and performs noise measurements over 128-chip periods. The result is that two 128-chip noise measurements can be obtained for each 256-chip period. For example, if the subscriber station determines that the C(128,1) code at code tree branch 206 is not being used to transmit a signal from a base station, the subscriber station can generate two 128-chip noise measurements for each 256-chip period spanned by the CPICH C(256,0) code at code tree branch 202 or by the C(256,1) P-CCPCH code at code tree branch 204.

Where no unused channel can be identified, noise estimates cannot be generated more frequently than once every 256 chips. Such noise estimates are less preferred because they require a longer time to generate and are less accurate than noise estimates made over a shorter period and then averaged together. Improved noise estimates can be generated where select codes in the code tree 220 are known by the subscriber station to be unoccupied (not being used to transmit data).

In order for a code to be considered unoccupied, all child codes of the code must also be unoccupied. For example, in order for the 32-bit C(32,31) code 218 to be considered unoccupied, both 64-bit child codes C(64,62) 210 and C(64,63) 216 must be unoccupied. In order for the 64-bit C(64,63) 216 code to be considered unoccupied, both 128-bit child codes C(128,126) 212 and C(128,127) 214 must be unoccupied. A code can be considered unoccupied when its corresponding code channel is not transmitted at all or is transmitted at zero power.

Figure 3:
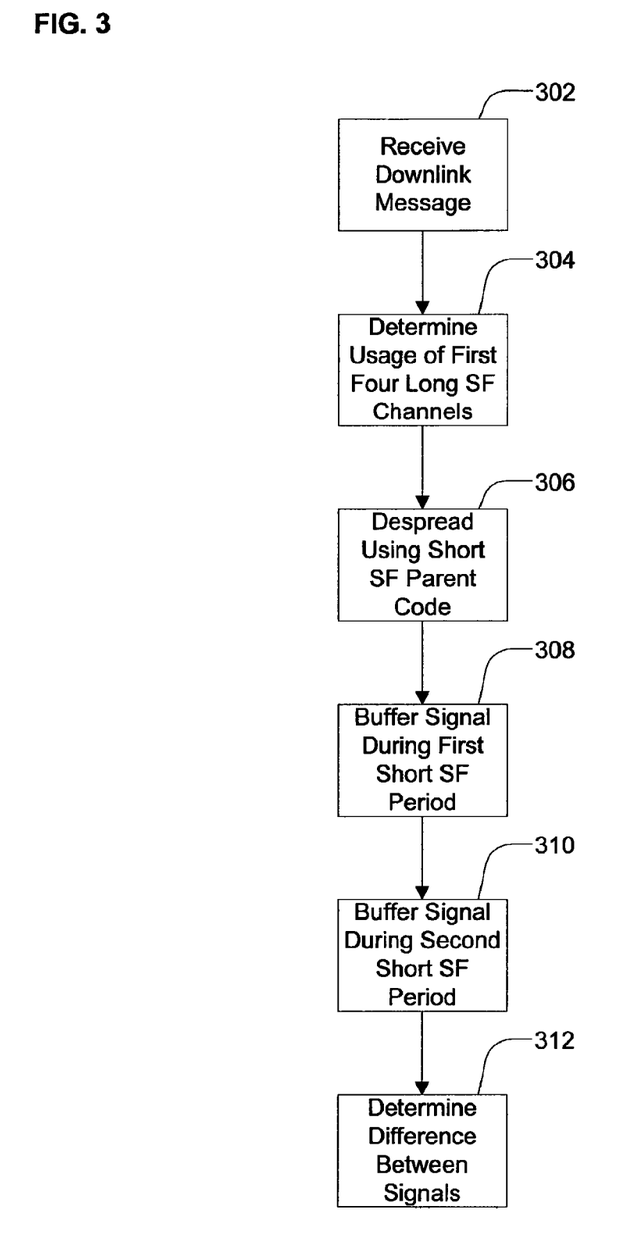
FIG. 3 shows an illustrative method for measuring noise based on usage of a first set of longest-spreading-factor codes sharing a common parent code.

FIG. 3 shows an illustrative method for performing improved noise estimates using knowledge of unoccupied code channels. The subscriber station determines the usage of a first four longest-spreading-factor codes at 304. The ways in which the subscriber station can make this determination include receiving a downlink message indicating the usage of these codes at 302. Alternatively, the subscriber station may perform measurements of received signals to independently determine which of the channels associated with the longest-spreading-factor codes are being used to transmit signals.

To enable improved noise estimation, the four longest-spreading-factor codes must share a common parent code. For example, the subscriber station may know a priori that the first longest-spreading-factor code, C(256,0) 202, is used to transmit an all-ones pilot channel (CPICH) and that the second longest-spreading-factor code, C(256,1) 204, is used to transmit P-CCPCH data. The subscriber station may receive a downlink message at 302 that indicates that both of the remaining codes under the parent code C(64,0) 208 are unoccupied. Specifically, the downlink message received at 302 is indicative of whether both the C(256,2) and C(256,3) codes are unoccupied or whether the parent C(128,1) code 206 is unoccupied. In an illustrative embodiment, the downlink message received at 302 is a single bit. The downlink message can be received from a base station on a dedicated channel, a broadcast channel, or a multicast channel.

When the subscriber station determines that half of the four child codes of a single parent code are unoccupied, the subscriber station can generate two noise estimates for each two code symbol periods of the parent code. Specifically, the subscriber station despreads the received signal using the parent code at 306, to provide a short-SF-despread signal. The short-SF-despread signal is then buffered during a first parent code symbol period at 308. During a second parent code symbol period, the short-SF-despread signal is buffered again at 310. A difference between the values buffered during the first parent code symbol period and the values buffered during the second parent code symbol period is determined at 312. The difference established at 312 constitutes a noise estimate for the receive channel. This difference can be determined by subtracting the first set of values from the second.

It is important to point out that the signals corresponding to parent code symbol periods that may be subtracted from each other must correspond to parent code symbol periods in which it is known that the data transmitted on the two occupied channels is identical. For example, when the subscriber station determines that both C(256,2) and C(256,3) are unoccupied, the subscriber station then knows that the chip values transmitted in the first 64-chip period are identical to the chip values transmitted in the second 64-chip period. Specifically, the first 64 chips of the CPICH code are identical to the second 64 chips of the CPICH code, and the first 64 chips of the P-CCPCH code are identical to the second 64 chips of the P-CCPCH code. Accordingly, any difference between the received chip energy values from the first 64-chip period and the second 64-chip period can only be attributed to noise. Similarly, the difference between the received chip energy values from the third 64-chip period and the fourth 64-chip period can only be attributed to noise. Therefore, when the subscriber station knows that the C(256,2) and C(256,3) codes are unoccupied, the subscriber station can generate one noise estimate during each of the first two 64-chip periods and the last two 64-chip periods of every of every 256-chip code symbol duration. These two noise estimates, requiring only 128 chips each to generate, may be used directly or averaged together to form a reliable noise estimate for the receive channel.

In an illustrative embodiment, the difference between received interference energy values are determined on a 64-chip symbol-by-symbol basis, for example, using a fast Hadamard transform (FHT). In an illustrative embodiment, each 256-chip code symbol period is divided into two successive 128-chip code symbol periods. Each of those two 128-chip code symbol periods is then divided into two successive 64-chip code symbol periods. The difference between the symbol energy over the first 64-chip period and the second 64-chip period are measured to provide a first noise estimate over the first 128-chip code symbol period. The difference between the symbol energy over the third 64-chip period and the fourth 64-chip period are measured to provide a first noise estimate over the second 128-chip code symbol period. Where, as in W-CDMA, the 64-chip parent code of the CPICH and P-CCPCH channels is the C(64,0) all-ones code 208, the 64-chip symbol energy measurements can be generated without actually multiplying the received samples by the C(64,0) code 208. Such multiplication is unnecessary, because multiplying the received samples by the all-ones code leaves the received samples unchanged.

The knowledge that the C(128,1) code 206 can also be used by the subscriber station to perform improved channel estimates for the wireless channel. Specifically, in W-CDMA the CPICH channel is a pilot channel that is never used to carry data. The CPICH channel is provided as a phase and amplitude reference for performing channel estimates that enable coherent demodulation of downlink signals. Where the C(128,1) code 206 is used to transmit data, channel estimates using the CPICH code 202 can only be generated once per 256-chip CPICH code symbol period. However, where the subscriber station knows that the P-CCPCH channel is transmitted at a 90% duty-cycle as described above, then during the periods in which P-CCPCH code is unoccupied, a channel estimate can be generated every 128-chip code symbol period using the parent C(128,0) code as the pilot code. The subscriber station can generate two channel estimates within a single 256-chip code symbol period.

In addition, where the subscriber station also knows that the C(128,1) code 206 is unoccupied, then during the periods in which P-CCPCH code is unoccupied, channel estimates can be generated every 64 chip code symbol period. Specifically, during the 10% of the time that the CPICH code is the only child code of parent code C(64,0) 208 that is occupied, then the parent code C(64,0) 208 can be used as a 64-chip pilot code. The subscriber station generates one channel estimate per 64-chip code symbol period, or four channel estimates per 256-chip code symbol period. In an illustrative embodiment, the subscriber station uses infinite-impulse-response (IIR) or finite-impulse-response (FIR) filtering of these 64-chip channel estimates to generate the channel estimates that are actually used for coherent demodulation of the remaining channels. Alternatively, the subscriber station may use the channel estimates directly without filtering.

Figure 4:
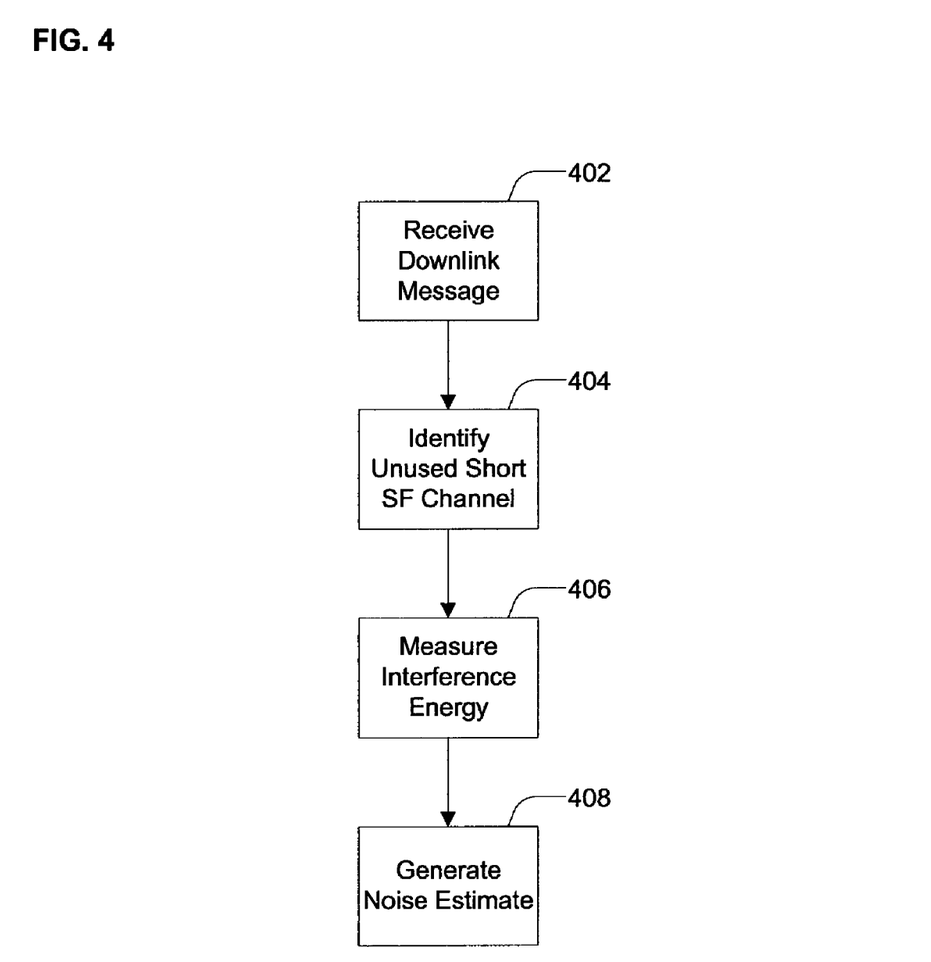
FIG. 4 shows an illustrative method for measuring noise based on an unoccupied short-spreading-factor code.

FIG. 4 shows another way to measure noise when the subscriber has knowledge of an unused code having a spreading factor shorter than the longest-spreading-factor code. The subscriber station identifies such an unused code at 404. The ways in which the subscriber station can identify the unused code include receiving a downlink message identifying the unused code at 402. Alternatively, the subscriber station may perform measurements of received signals to independently identify an unused code.

Once the subscriber station has identified an unused code, the subscriber station can generate a noise estimate for every symbol period corresponding to the unused short-SF code. The subscriber station despreads the received signal using the unused code at 406, to provide a short-SF-despread signal. The subscriber station then generates a noise estimate from the short-SF-despread signal at 408.

For example, if the unused code has a spreading factor of 64 such that the code symbol length of the unused code has a length of 64 chips, the subscriber station can generate at 408 a new noise estimate every 64 chips. Alternatively, the subscriber station could generate four separate noise estimates for every 256 chips. The four noise estimates could be averaged together or used separately. Alternatively, the noise estimates could be entered into an infinite impulse response (IIR) filter or a finite impulse response (FIR) filter. Averaging the four 64-chip estimates for every 256-chip period may be viewed as a specific embodiment of an FIR filter.

Because the subscriber station knows that no signal is transmitted using the identified unused code, and also because the subscriber station knows that all other codes are orthogonal to the unused code, any difference between the received chip energy values received from one unused code symbol period and the next can only be attributed to noise. In an illustrative embodiment using a 64-chip unoccupied code, the subscriber station determines the signal energy for each 64-chip period and then determine a difference between that symbol energy value and the symbol energy value from the previous 64-chip period. In an illustrative embodiment, the symbol energy values are determined using a fast Hadamard transform (FHT). The short-SF noise estimates may be utilized directly by the subscriber station, or may first be filtered using an infinite impulse response (IIR) or finite impulse response (FIR) filter. One example of an FIR filter is averaging four consecutive noise measurements to generate a 256-chip noise estimate for each 256-chip code symbol period.

In proposed W-CDMA systems, the CPICH channel is not used to carry data information. Specifically, the CPICH channel is a pilot channel that remains at a constant value. Where the CPICH channel is the all-ones C(256,0) code 202, the CPICH channel represents a constant DC signal that is effectively unmodulated by any orthogonal code. Another aspect of proposed W-CDMA systems is the discontinuous transmission of the P-CCPCH channel. Specifically, the P-CCPCH channel is transmitted at a 90% duty-cycle, such that the corresponding P-CCPCH code 204 is unoccupied during every tenth 256-chip code symbol period. The subscriber station can easily determine the phase of these cycles and can therefore identify the one out of ten 256-chip code symbol periods during which the P-CCPCH code 204 is unoccupied. Where the remaining 128-chip code 206 is also known to be unoccupied, this allows the subscriber station to treat the 64-chip parent code C(64,0) 208 as essentially unoccupied. Accordingly, in an illustrative embodiment the subscriber station may alternate between the noise estimation techniques shown in FIG. 3 and FIG. 4 based on when the P-CCPCH code 204 is occupied. Specifically, during nine out of ten 256-chip code symbol periods, the subscriber station performs noise estimation as described in conjunction with FIG. 3. However, during every tenth 256-chip code symbol period the subscriber station generates one noise estimate for each of the three transitions between 64-chip segments of the 256-chip code symbol period.

During every tenth 256-chip code symbol period, when the P-CCPCH channel is not transmitted, the 256-chip code symbol period is divided into four sequential 64-chip periods, the subscriber station measures the interference energy for each of the four 64-chip periods at 406, and generates noise estimates at 408 by determining the difference between the interference energy measurements. A first noise estimate is generated from the symbol energy difference between the first and second 64-chip periods, a second noise estimate is generated from the symbol energy difference between the second and third 64-chip periods, and a third noise estimate is generated from the symbol energy difference between the third and fourth 64-chip periods. In an alternate embodiment, the subscriber station can generate more than three noise measurements in the tenth 256-chip code symbol period by determining the difference between non-adjacent 64-chip periods. For example, a fourth noise estimate could be generated by determining a difference between interference measurements during the first and fourth 64-chip segments within the 256-chip code symbol period.

Alternatively, where the subscriber station knows of an additional unoccupied code that is not in the C(64,0) code tree branch, the subscriber station may perform simultaneous noise estimations using multiple unoccupied codes and combine the noise estimates. For example, where both the C(128, 1) code 206 and the C(64,62) code 210 are both known to be unoccupied, then every tenth 256-chip code symbol period when the P-CCPCH 204 code is unoccupied, the subscriber station could combine the noise estimates generated using the C(64,0) 208 and C(64,62) 210 code symbols. Additionally, noise estimates using code symbols of different chip lengths could also be combined to create more accurate combined noise estimates. For example, where the subscriber station knows that codes C(64,62) 210 and C(128,126) 212 are both unoccupied, the subscriber station may generate noise estimates using both unoccupied codes and then combine the noise estimates to form one combined noise estimate for every 128 or every 256 chips.

Figure 5:
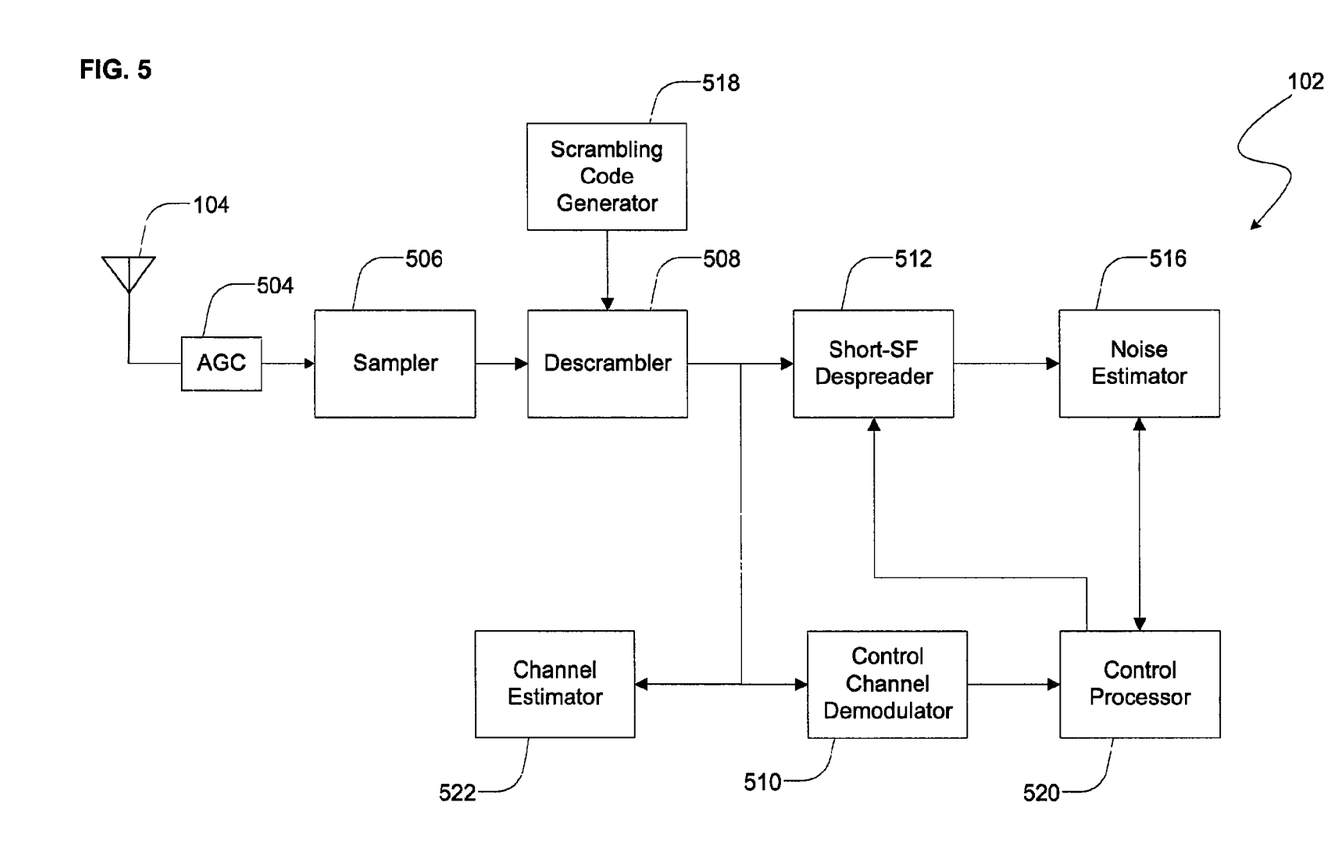
FIG. 5 shows an illustrative subscriber station for measuring noise using short-spreading-factor codes.

FIG. 5 shows an illustrative apparatus for subscriber station 102, configured to measure noise based on usage of a first set of longest-spreading-factor codes sharing a common parent code, as discussed in relation to FIG. 3. A wireless signal is received through antenna 104. As mentioned above, subscriber station 102 may use multiple antennas without departing from the embodiments described herein. The gain of the signal is adjusted in automatic gain control (AGC) 504 before being sampled at sampler 506. AGC 504 may also include either a digital or analog downconverter to downconvert the received signal to an intermediate or baseband frequency. The sampled signal is then provided to descrambler 508, where the samples are multiplied by a scrambling code generated by scrambling code generator 518 to provide a descrambled signal.

Sampler 506 may perform real sampling, generating a single stream of digital samples. Alternatively, sampler 506 may perform complex sampling providing a complex sample stream having an in-phase signal component and a quadrature-phase signal component. Sampler 506 may sample the received signal at the rate of one sample per chip (commonly referred to as "chip-x-1") or may sample at a higher rate such as four samples per chip (commonly referred to as "chip-x-4").

Scrambling code generator 518 may generate a real scrambling code represented by a single stream of digital values or may generate a complex scrambling code having a real component and an imaginary component. Where either the scrambling code or the sample stream are exclusively real, descrambler 508 performs its descrambling function using real multiplication. Where both the scrambling code and the sample stream are complex, descrambler 508 performs complex multiplication of the complex sample stream by the complex scrambling code. Such complex multiplication is described in detail in U.S. Pat. No. 5,930,230 [the '230 patent]. The subscriber station 102 may also utilize a pilot filter (not shown) in order to correct for phase errors inherent in the channel. A detailed example of a real pilot filter is provided in U.S. Pat. No. 5,506,865, and an example of a complex pilot filter is provided in the aforementioned '230 patent.

In an illustrative embodiment, the scrambling code generated by scrambling code generator 518 corresponds to a scrambling code used by an individual base station. In an illustrative embodiment, each base station uses a different scrambling code to scramble all its transmissions in order to provide orthogonality or near orthogonality between the signals of one base station and the next. For example, some base stations scramble their transmissions using a common pseudonoise (PN) sequence that is offset in time to provide near orthogonality. The base stations may use the PN sequence until it repeats (for example, every 26.7 milliseconds) or may truncate and restart the PN sequence at regular intervals (for example, every 10 milliseconds at the beginning of a message frame). The use of other types of scrambling codes is also anticipated.

The descrambled signal provided by descrambler 508 is multiplied by a short-spreading-factor (short-SF) code in short-SF despreader 512. The short-SF code used by short-SF despreader 512 is determined from a control signal from control processor 520. For example, where the subscriber station is receiving both a CPICH and a P-CCPCH signal, but where the next 128-chip code 206 is known to be unoccupied, short-SF despreader 512 despreads the received samples in 64-chip increments using the C(64,0) code 208. One of skill in the art will recognize that despreading using an all-ones code such as C(64,0) does not require any actual multiplication by a code, but can be accomplished by merely buffering the chip energy values. In an illustrative embodiment, short-SF despreader 512 buffers the first 64 chip energy values of each 128-chip code symbol period on a chip-by-chip basis in a buffer (not shown). During the second 64-chip period of each 128-chip code symbol period, short-SF despreader 512 determines the difference between the chip energy in each of the 64 chip periods and the corresponding chip energy from the previous 64-chip period and provides each of the 64 chip energy difference values to noise estimator 516. Noise estimator 516 uses these chip energy difference values to determine a noise estimate for each 128-chip code symbol period. Alternatively, short-SF despreader 512 provides a single interference measurement for each whole 64-chip code symbol period, and noise estimator 516 uses a pair of interference measurements to generate a noise estimate for each 128-chip code symbol period. Noise estimator 516 provides the noise estimations to control processor 520. Thus, in an illustrative embodiment, the subscriber station apparatus 102 operates in accordance with the method described in FIG. 3.

Alternatively, the subscriber station apparatus 102 can also be operated in accordance with the method described in FIG. 4. For example, where the subscriber station determines that a short-SF code outside the code tree branch C(64,0) 208 is unoccupied, the subscriber station can generate a new noise estimate after each code symbol period corresponding to the unoccupied code. In that case, control processor 520 provides a signal to short-SF despreader 512 identifying the unoccupied short-SF code to be used for noise measurements. In an illustrative embodiment, short-SF despreader 512 utilizes a buffer (not shown) having the same length as the unoccupied short-SF code and provides to noise estimator 516 chip-by-chip energy differences from one unoccupied-code-symbol period to the next. Alternatively, short-SF despreader 512 can generate a single interference measurement value for each code symbol period corresponding to the unoccupied code symbol. In an illustrative embodiment, short-SF despreader 512 generates each single interference measurement value using a fast Hadamard transform (FHT) over the unoccupied code symbol. In this way, noise estimator 516 can generate a new noise estimate after every code symbol period corresponding to the unoccupied code.

As discussed above, where the subscriber station 102 knows that the C(128,1) code 206 is unoccupied, and where the P-CCPCH channel is transmitted in only nine out of ten 256-chip code symbol periods, control processor 520 reconfigures short-SF despreader 512 and noise estimator 516 in order to perform optimal noise measurements for each 256-chip code symbol period. Specifically, control processor 520 configures short-SF despreader 512 and noise estimator 516 to generate one noise estimate every 128 chips during the 90% of the time that the P-CCPCH channel is being transmitted. Control processor 520 reconfigures short-SF despreader 512 and noise estimator 516 to generate one noise estimate every 64 chips during the 10% of the time that the P-CCPCH channel is not being transmitted.

Also discussed above is how the subscriber station can generated improved channel estimates based on knowledge that both the P-CCPCH 204 and C(128,1) 206 codes are unoccupied, at least during one 256-chip period out of every ten. In an illustrative embodiment, the output of descrambler 508 is provided to a channel estimator 522. Channel estimator 522 generates one channel estimate over each code symbol period of the C(64,0) code 208. Each channel estimate includes both amplitude and phase information, which are used to improve the performance of coherent demodulation of the various downlink channel signals. Channel estimator 522 can generate each of these channel estimates by filtering the output of descrambler 508, for example using IIR or FIR filtering. In an illustrative embodiment, channel estimator 522 further includes additional secondary filters for filtering the 64-chip channel estimates. In an illustrative embodiment, these secondary filters may be IIR or FIR filters. One example of an FIR filter is averaging every four 64-chip channel estimates in each 256-chip code symbol period to form a combined channel estimate for every 256-chip code symbol period.

The identification of unoccupied codes can be accomplished in any of several ways. For example, the identity of one or more unoccupied codes can be transmitted within a signal on a control channel received by the subscriber station 102. As discussed above, where a base station needs only to indicate whether the C(128,1) code 206 is unoccupied, this can be accomplished using a single information bit. For example, the transmission of a '1' could indicate that the C(128,1) code 206 is unoccupied, where transmission of a '0' could indicate that the C(128,1) code is being used to transmit data. The single bit may be transmitted from the base station over a control channel and demodulated using control channel demodulator 510. In an illustrative embodiment, the output of descrambler 508 is provided to control channel demodulator 510, which demodulates the single information bit to determine whether its value is a '1' or a '0' and provides the decoded bits to control processor 520. Control processor 520 adjusts the control signals to short-SF despreader 512 and to noise estimator 516 based on the value of the information bit.

The control channel signal may also include data that identifies an unoccupied code that is outside the code tree branch C(64,0) 208. Control channel demodulator 510 demodulates the control channel signal and provides the data indicative of the unoccupied code to control processor 520. Control processor 520 then adjusts the control signals to short-SF despreader 512 and noise estimator 516 directing them to generate noise estimates utilizing the unoccupied code. Noise estimator 516 provides the noise estimates to control processor 520.

As discussed above, the control channel whose signals are demodulated by control channel demodulator 510 may be a broadcast channel, a channel dedicated to the subscriber station 102, or a multicast channel used to transmit information to a plurality of subscriber stations that includes subscriber station 102. Where the subscriber station 102 is configured to perform multiple types of noise estimation, such as the different types of noise estimation shown in FIGS. 3 and 4, the different types of unoccupied-channel information may be carried on channels of different types. For example, the single bit indicating the usage of the C(128,1) code 206 may be transmitted using a broadcast channel, where another message identifying a different unoccupied code might be carried on a dedicated channel.

Many different formats for identifying an unoccupied code are anticipated herein. In an illustrative embodiment, a control channel is used to transmit the spreading factor and identity of an unused code. For example, a code C(X,Y) could be identified using a bit-mapped 8-bit value including two bits to identify X and six bits to identify Y. Using this kind of a code, the two bits would be sufficient to indicate any of the code lengths from 16 to 128 chips or from 8 to 64 chips. The six bits could provide an index to any of 64 codes within the group identified by the first two bits. Alternatively, a set of codes could be identified using fewer control channel bits to identify one of a predetermined set of short-SF codes that are designated as seldom-used. For example, the base station could include a rule that C(32,31) 218, C(64,63) 216, and C(128, 127) 214 are always to be allocated last. Any of these codes could be indicated using a two-bit message. For example, '00' could indicate that none of the channels are unoccupied, '01' could indicate that C(32,31) is unoccupied and so on. As yet another possible alternative, the usage of a single predetermined short-SF code, for example the 64-chip code C(64,1) (not shown), could be indicated using a single bit. Alternatively, the occupied or unoccupied status of any other predetermined code could be indicated using a single bit assigned specifically to that predetermined code.

Alternatively, the apparatus shown in FIG. 5 could also be used to identify an unused code channel without receiving such information over a control channel. In an illustrative embodiment, the subscriber station 102 utilizes the apparatus in FIG. 5 to perform an energy-threshold search over some or all of the possible 64-chip codes.

Figure 6:
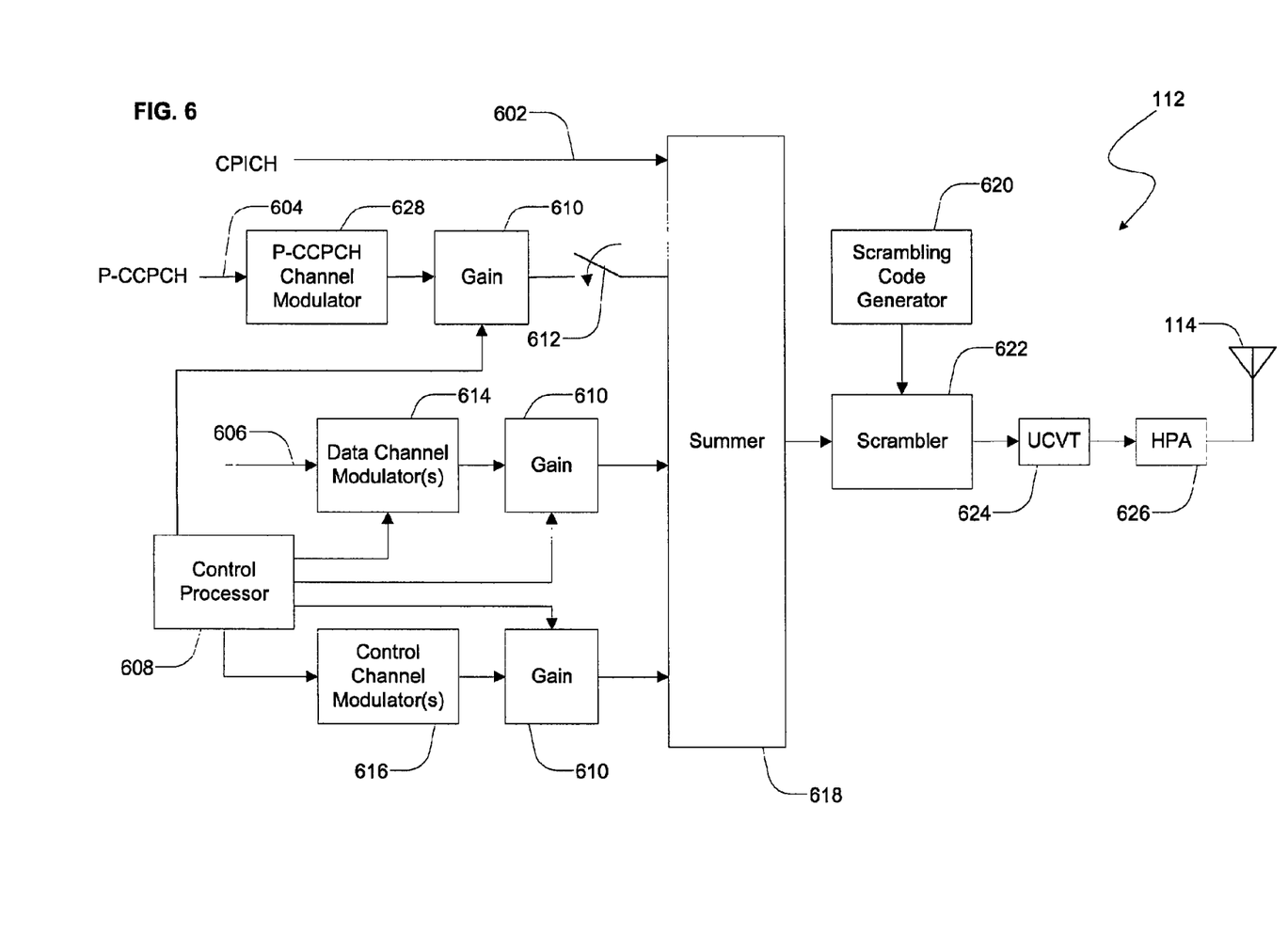
FIG. 6 shows an illustrative base station apparatus for providing transmission signals that allow noise estimation using short-SF codes.

FIG. 6 shows an illustrative base station apparatus for providing transmission signals that allow noise estimation using short-SF codes. The unmodulated CPICH signal 602 is provided to a summer 618. The P-CCPCH signal 604 is modulated using the P-CCPCH code 204 in a P-CCPCH channel modulator 628. The modulated P-CCPCH signal is then provided to a gain controller 610 that individually adjusts the gain of the modulated P-CCPCH signal. In an illustrative embodiment, switch 612 periodically gates the transmission of the P-CCPCH channel, for example at a 90% duty-cycle in which the channel is transmitted 90% of the time and not transmitted the remaining 10% of the time. In an illustrative embodiment, switch 612 opens for one out of every ten 256-chip code symbol periods.

Data signals 606 are provided to one or more data channel modulators 614, which modulate the individual data signals using code symbols of varying code symbol lengths and spreading factors to provide modulated data signals. After modulation in modulators 614, each of the data signals is individually gain-adjusted by a gain controller 610. At least one unoccupied-channel signal provided by control processor 608 is modulated using at least one control channel modulator 616 to provide a modulated control channel signal. The modulated control channel signal is then gain-adjusted by gain controller 610. In an illustrative embodiment, control processor 608 provides gain control signals that determine the gain to be applied to each signal by gain controllers 610. Alternatively, the gain control signals could be provided by an additional control processor (not shown).

Control processor 608 provides the unoccupied-channel signal based on which codes in code tree 220 are occupied. The unoccupied-channel signal or signals can be formatted in any of the ways described above in conjunction with FIG. 5. For example, a single bit may be used to indicate whether code C(128,1) 206 is occupied. Alternatively, a single bit may be used to indicate whether a single 64-chip code other than C(64,0) 208, for example the 64-chip code C(64,1) (not shown), is occupied. Or, multiple bits may be used to identify one of a set of possible unoccupied codes of varying spreading factors.

In an illustrative embodiment, control processor 608 allocates code channels for use in transmitting data signals to subscriber stations. In order to maximize the probability that a short-SF code is available for subscriber stations to use for noise measurements, control processor 608 allocates predetermined short-SF codes designated as seldom-used only after all other codes of the same SF are already occupied. For example, as described above, control processor 608 could keep C(32,31) 218, C(64,63) 216, and C(128,127) 214 unoccupied as often as possible and indicate the shortest-SF unoccupied code using a two-bit message. For example, '00' could indicate that none of the channels are unoccupied, '01' could indicate that C(32,31) is unoccupied and so on. Control processor 608 holds any designated seldom-used short-SF code unoccupied as often as possible.

In an illustrative embodiment, the gain-adjusted CPICH, P-CCPCH, modulated data signals, and modulated control signals are added together in summer 618, which sums the signals into a combined transmit signal. The combined transmit signal is then multiplied by a scrambling code in scrambler 622 to provide a scrambled signal. Scrambling code generator 620 provides the scrambling code to scrambler 622. The scrambling code provided by scrambling code generator 620 should be the same as the scrambling code generated by the scrambling code generator 518 in the subscriber station 102. Accordingly, and as discussed above, the scrambling code provided by scrambling code generator 620 may be a real or complex code. Also, the scrambling code may be a pseudonoise (PN) code. Where the combined transmit signal provided from summer 618 is a complex signal, scrambler 622 performs complex multiplication to scramble the combined transmit signal. The scrambled signal generated by scrambler 622 is upconverted in upconverter (UCVT) 624, amplified in high-power amplifier (HPA) 626, and transmitted through antenna 114. As mentioned above, base station 112 may use multiple antennas without departing from the embodiments described herein.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Such implementations may be applied, for example, to the control channel demodulator 510, short-SF despreader 512, noise estimator 516, and control processor 520. Furthermore, a general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a subscriber station. In the alternative, the processor and the storage medium may reside as discrete components in a subscriber station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A channel estimation method comprising:
   determining that every longest-spreading-factor code having a common parent code with an all-ones pilot code is unoccupied, wherein the common parent code has a short spreading factor that is shorter than a longest spreading factor; and
   performing, at a channel estimator, channel estimation using the common parent code during two or more time periods within a time period of the all-ones pilot code, wherein the channel estimator receives an output of a descrambler as an input.

2. The method of claim 1, wherein at least one code of the every longest-spreading-factor code is occupied discontinuously at a predetermined duty-cycle, the method further comprising identifying a period during the predetermined duty-cycle when the at least one code is unoccupied.

3. The method of claim 1, wherein at least one code of the every longest-spreading-factor code is occupied discontinuously at a predetermined duty-cycle, wherein the at least one code has a spreading factor equal to the longest spreading factor, and wherein the short spreading factor is equal to one fourth of the longest spreading factor, the method further comprising identifying a period during the predetermined duty-cycle when the at least one code is unoccupied.

4. An apparatus comprising:
   means for determining that every longest-spreading-factor code having a common parent code with an all-ones pilot code is unoccupied, wherein the common parent code has a short spreading factor that is shorter than a longest spreading factor; and
   means for performing channel estimation using the common parent code during two or more time periods within a time period of the all-ones pilot code.

5. An apparatus comprising:
   a control processor configured to determine that every longest-spreading-factor code having a common parent code with an all-ones pilot code is unoccupied, wherein the common parent code has a short spreading factor that is shorter than a longest spreading factor; and
   a channel estimator configured to generate a channel estimation using the common parent code during two or more time periods within a time period of the all-ones pilot code, wherein the channel estimator receives an output of a descrambler as an input.

6. The apparatus of claim 5, wherein the control processor determines that every longest-spreading-factor code having the common parent code with an all-ones pilot code is unoccupied based on a received downlink message indicating a usage of one or more longest-spreading-factor codes.

7. The apparatus of claim 5, wherein at least one code of the every longest-spreading-factor code is occupied discontinuously at a predetermined duty-cycle, wherein the at least one code has a spreading factor equal to the longest spreading factor, and wherein the short spreading factor is equal to one fourth of the longest spreading factor, and wherein the control processor is further configured to identify a period during the predetermined duty-cycle when the at least one code is unoccupied.

8. A non-transitory computer-readable medium embodying instructions which, when executed by a processor, cause said processor to perform a channel estimation method comprising:
   determining that every longest-spreading-factor code having a common parent code with an all-ones pilot code is unoccupied, wherein the common parent code has a short spreading factor that is shorter than a longest spreading factor; and
   providing a control signal to a channel estimator to cause the channel estimator to generate a channel estimation using the common parent code during two or more time periods within a time period of the all-ones pilot code, wherein the channel estimator receives an output of a descrambler as an input.

9. A channel estimation method, comprising:
   determining, based on a received downlink message indicating a usage of at least one longest-spreading-factor code, that every longest-spreading-factor code sharing a parent code in common with an all-ones pilot code is unoccupied, wherein the all-ones pilot code is a longest-spreading-factor code, and wherein the parent code includes a short spreading factor that is shorter than a longest spreading factor; and
   performing channel estimation using the parent code.

10. The method of claim 9, wherein at least one code of the longest-spreading-factor codes sharing the parent code is occupied discontinuously at a predetermined duty-cycle, the method further comprising identifying a period during the predetermined duty-cycle when the at least one code is unoccupied.

11. The method of claim 9, wherein at least one code of the longest-spreading-factor codes sharing the parent code is occupied discontinuously at a predetermined duty-cycle, wherein the at least one code includes a spreading factor equal to the longest spreading factor, wherein the short spreading factor is equal to one fourth of the longest spreading factor, and wherein the method further comprises identifying a period during the predetermined duty-cycle when the at least one code is unoccupied.

12. A non-transitory computer-readable medium embodying instructions which, when executed by a processor, cause the processor to:
   determine, based on a received downlink message indicating a usage of at least one longest-spreading-factor code, that every longest-spreading-factor code sharing a parent code in common with an all-ones pilot code is unoccupied, wherein the all-ones pilot code is a longest-spreading-factor code, and wherein the parent code includes a short spreading factor that is shorter than a longest spreading factor; and
   perform channel estimation using the parent code.

13. The computer-readable medium of claim 12, wherein at least one code of the longest-spreading-factor codes sharing the parent code is occupied discontinuously at a predetermined duty-cycle, and wherein the instructions are further operable to cause the processor to identify a period during the predetermined duty-cycle when the at least one code is unoccupied.

14. The computer-readable medium of claim 12, wherein at least one code of the longest-spreading-factor codes sharing the parent code is occupied discontinuously at a predetermined duty-cycle, wherein the at least one code includes a spreading factor equal to the longest spreading factor, wherein the short spreading factor is equal to one fourth of the longest spreading factor, and wherein the instructions are further operable to cause the processor to identify a period during the predetermined duty-cycle when the at least one code is unoccupied.

15. An apparatus, comprising:
   means for determining that every longest-spreading factor code having a common parent code with an all-ones pilot code is unoccupied, wherein the common parent code has a short spreading factor that is shorter than a longest spreading factor; and
   means for performing channel estimation using the common parent code.

16. The apparatus of claim 15, wherein the means for determining comprises a control processor, and wherein the means for performing channel estimation comprises a despreader.

17. The apparatus of claim 16, wherein at least one code of the longest-spreading-factor codes having the common parent code is occupied discontinuously at a predetermined duty-cycle, and wherein the control processor is further configured to identify a period during the predetermined duty-cycle when the at least one code is unoccupied.

18. The apparatus of claim 16, wherein at least one code of the longest-spreading-factor codes having the common parent code is occupied discontinuously at a predetermined duty-cycle, wherein the at least one code has a spreading factor equal to the longest spreading factor, and wherein the short spreading factor is equal to one fourth of the longest spreading factor, and wherein the control processor is further configured to identify a period during the predetermined duty-cycle when the at least one code is unoccupied.

19. An apparatus comprising:
   a control processor configured to determine, based on a received downlink message indicating a usage of at least one longest-spreading-factor code, that every longest-spreading-factor code sharing a parent code with an all-ones pilot code is unoccupied, wherein the all-ones pilot code is a longest-spreading-factor code, and wherein the parent code includes a short spreading factor that is shorter than a longest spreading factor; and
   a despreader configured to perform channel estimation using the parent code.

20. The apparatus of claim 19, wherein at least one code sharing the parent code is occupied discontinuously at a predetermined duty-cycle, wherein the at least one code includes a spreading factor equal to the longest spreading factor, and wherein the short spreading factor is equal to one fourth of the longest spreading factor, and wherein the control processor is further configured to identify a period when the at least one code is unoccupied.

21. An apparatus, comprising:
   means for determining that every longest-spreading factor code sharing a parent code in common with an all-ones pilot code is unoccupied, wherein the all-ones pilot code is a longest-spreading-factor code, and wherein the parent code includes a short spreading factor that is shorter than a longest spreading factor; and
   means for performing channel estimation using the parent code.

22. The apparatus of claim 21, wherein the means for determining comprises a control processor, and wherein the means for performing channel estimation comprises a despreader.

23. The apparatus of claim 22, wherein at least one code of the longest-spreading-factor codes sharing the parent code is occupied discontinuously at a predetermined duty-cycle, and wherein the control processor is further configured to identify a period during the predetermined duty-cycle when the at least one code is unoccupied.

24. The apparatus of claim 22, wherein at least one code of the longest-spreading-factor codes sharing the parent code is occupied discontinuously at a predetermined duty-cycle, wherein the at least one code includes a spreading factor equal to the longest spreading factor, and wherein the short spreading factor is equal to one fourth of the longest spreading factor, and wherein the control processor is further configured to identify a period during the predetermined duty-cycle when the at least one code is unoccupied.

* * * * *